UNITED STATES PATENT OFFICE.

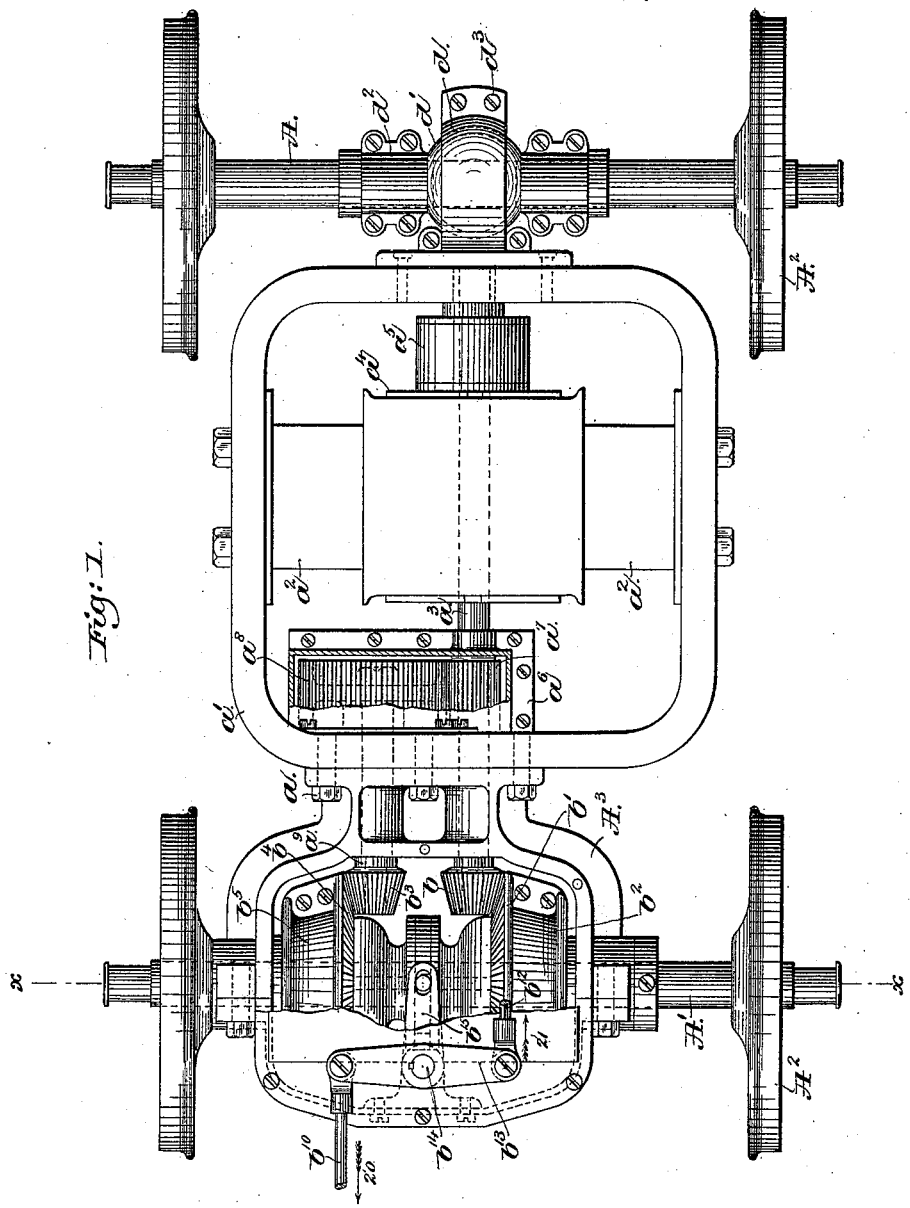

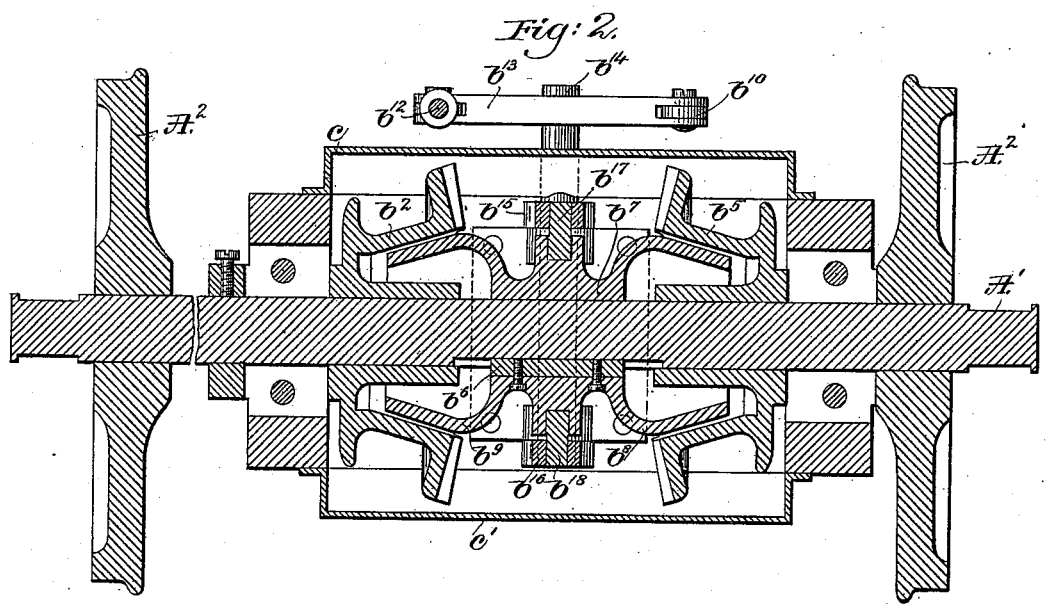

SAMUEL E. MOWER, OF NEW HAVEN, CONNECTICUT, ASSIGNOR TO HENRY G. THOMPSON & SONS, OF SAME PLACE.

ELECTRIC-MOTOR MECHANISM.

SPECIFICATION forming part of Letters Patent No. 447,255, dated February 24, 1891.

Application filed May 31, 1890. Serial No. 353,830. (No model.)

*To all whom it may concern:*

Be it known that I, SAMUEL E. MOWER, of New Haven, county of New Haven, State of Connecticut, have invented an Improvement in Electric-Motor Mechanism, of which the following description, in connection with the accompanying drawings, is a specification, like letters on the drawings representing like parts.

This invention relates to electric-motor mechanism in which the armature is revolved continuously, and which is especially adapted, among other things, to be used on electric-railway cars.

Prior to my present invention I am aware that an electric-railway car has been propelled by an electric motor having its armature mounted upon one of the car-axles to run loose thereon; but such arrangement or construction is objectionable on account of the greatly-increased weight located at one end of the car, the said weight having the tendency to raise from the rails the car-wheels on the axle at the opposite end of the car, thereby reducing the traction between said wheels and rails. In accordance with my invention I obviate this objectionable feature by supporting the motor between the car-axles and connecting the armature-shaft to one or both of the said car-axles by speed-reducing gears, one of which is loose on the car-axle and is adapted to be made fast thereon by a suitable clutch mechanism. The armature-shaft is preferably also connected with the car-axle by another or second set of speed-reducing gears, one of which is loose on the car-axle and adapted to be made fast on the car-axle, preferably by the same clutch mechanism, the said second set of gears being differentiated from the first set of gears, whereby the car may be run at different rates of speed while the speed of the armature remains the same or constant.

My invention therefore consists in an axle, a continuously-running electric motor, speed-reducing gears connecting the revolving armature-shaft of the motor with the axle, one of the said gears being loose on the axle, a second set of speed-reducing gears connecting the armature-shaft with the axle, one gear of the second set of gears being loose on the axle, and a double-beveled cone friction-clutch mechanism secured on the axle intermediate of the loose gears of the speed-reducing gears, substantially as will be described.

Other features of my invention will be pointed out in the claims at the end of this specification.

Figure 1 is a top or plan view of the car-axles mounted on wheels and my improved electric-motor mechanism to enable my invention to be understood, the top of the motor mechanism being partly broken out to more fully show the working parts; and Fig. 2, a section of the motor mechanism shown in Fig. 1 on line $x\,x$, looking toward the left in Fig. 1.

The axles A A', mounted upon wheels $A^2$, may be such as are used with street-railway cars of ordinary construction. The axle A', as herein shown, has mounted upon it a yoke or frame $A^3$, to which is secured, as by bolts $a$, the motor-supporting frame $a'$, the said frame being supported at its opposite end on the car-axle A, as will be described. The motor-supporting frame $a'$, located between the car-axles A A', has secured to it the field-magnets $a^2$ of the motor, and the said frame supports the armature-shaft $a^3$, having upon it the armature $a^4$, of any usual or well-known construction, the said armature-shaft being provided at one side of the motor with the usual commutator $a^5$. The armature-shaft $a^3$ is connected to the car-axle A', as herein shown, by two sets of speed-reducing gears, one set consisting, as shown, of a bevel-pinion $b$ on the armature-shaft and a bevel-gear $b'$, preferably secured to or forming part of a conical hub $b^2$, loose on the axle A'. The second set of speed-reducing gears consists, as shown, of a pinion $a^7$ on the armature-shaft in mesh with a gear $a^8$ on a counter-shaft supported by the frame $a'$ and yoke $A^3$ and a bevel-pinion $b^3$ on the counter-shaft in mesh with a bevel-gear $b^4$ on a conical hub $b^5$, loose on the car-axle A' at its opposite end.

Between the conically-shaped hubs $b^2\,b^5$ the car-axle A' has secured to it, as by a key $b^6$, (see Fig. 2,) a clutch mechanism, herein shown as a hub $b^7$, provided with conically-shaped ends $b^8\,b^9$, which are adapted to be engaged with the inner sides of the conically-shaped hubs $b^2 b^5$. The clutch mechanism $b^7$ is adapted to be moved on the car-axle A′, as herein shown, by levers $b^{10} b^{12}$, secured to the ends of a lever $b^{13}$, pivoted, as at $b^{14}$, to a rod or spindle having arms $b^{15} b^{16}$, (see Fig. 2,) provided with studs $b^{17} b^{18}$ to enter an annular groove in the hub $b^7$. The gear $b'$ and pinion $a^7$ form a direct reducing mechanism, and the gear $b^4$, pinion $b^3$, gear $a^8$, and pinion $a^7$ form a differential speed-reducing mechanism.

The yoke or frame A³ has secured to its top, bottom, and side covers $c\ c'$, which form an inclosing box or case for the mechanism supported by the car-axle A′, the said box or case in practice being filled or partially filled with oil or other lubricant.

The case or box $a^6$, in which rotate the pinion $a^7$ and gear $a^8$, in practice also contains oil or other lubricant for the said gear and pinion.

The motor-supporting frame $a'$ has secured to it, as herein shown, two semi-spherical arms $d$, only one of which is shown in Fig. 1, the said arms encircling the hollow sphere $d'$, mounted on the shaft A and provided with side bearing-boxes $d^2$, the arms $d$ being secured together, as herein shown, by bolts $d^3$. The hollow sphere $d'$ and semi-spherical arms $d$ form a ball-and-socket joint, by which the car-axle A is allowed to curve freely without disturbing the motor mechanism.

In practice the armature-shaft $a^3$ is rotated continuously, and the conical hubs $b^2 b^5$ on the car-axle A are also rotated continuously by means of the beveled pinions $b\ b^3$, the counter-shaft $a^9$, on which the beveled pinion $b^7$ is mounted, being driven from the armature-shaft by means of the pinion $a^7$ and gear $a^8$.

When the clutch mechanism is in its central position, (shown in Figs. 1 and 2,) the car is stationary; but if it is desired to start the car gradually the operator moves the lever $b^{10}$ in the direction of arrow 20, Fig. 1, and brings the cone $b^9$ into engagement with the conical hub $b^5$, the rate of rotation of the car-axle A′ being proportional to the pressure with which the cone $b^9$ is engaged with the conical hub $b^5$, until the said cone has been brought firmly into engagement with the said conical hub, at which time the car-axle A′ is rotating at the same speed as the conical hub $b^5$. By means of the large gear $a^8$ the speed of rotation of the armature-shaft is reduced, so that the counter-shaft $a^9$ is rotating at a much less speed than the said armature-shaft, and by means of the large beveled gear $b^4$ the car-axle A′ is rotated at a substantially slow speed as compared with the rotation of the armature-shaft.

In practice the car-axle A′ will be rotated at about five miles an hour when the cone $b^9$ is in engagement with the conical hub $b^5$, and if it is desired to increase from the substantially slow speed to a substantially high speed—as, for instance, to fifteen miles an hour—the operator moves the clutch mechanism so as to disengage the cone $b^9$ from the conical hub $b^5$ and engage the cone $b^8$ with the conical hub $b^2$, the latter being driven directly from the armature-shaft, rotating at a much higher speed than the conical hub $b^5$, which is driven from the counter-shaft. It will be noticed that the speed of the armature-shaft remains constant or the same both when the car is traveling at a high speed and when traveling at a slow speed. It will thus be seen that the car may be started very slowly by the engagement of the cone $b^9$ with the conical hub $b^5$, which is of especial advantage when the car is heavily loaded, and when the car has attained its momentum the speed may be increased very readily by shifting the clutch mechanism so as to engage the cone $b^8$ with the conical hub $b^2$. This is of especial advantage when carrying heavy loads over substantially high grades, for the car may be maintained at a high speed while on a level, and when a grade is reached the clutch mechanism may be shifted to engage the cone $b^9$ with the conical hub $b^5$ to reduce the speed of the car without reducing the speed of the armature-shaft, and in this way relieving the motor from strain and obviating generation of counter-currents in the motor, thereby maintaining the efficiency of the motor at its maximum point.

I have herein shown the rear end of the supporting-frame $a'$ as sustained by the car-axle A; but it is evident the said frame may be supported from the car-body or in other usual manner.

I claim—

1. An axle, a continuously-running electric motor, speed-reducing gears connecting the revolving armature-shaft of the motor with the axle, one of the said gears being loose on the axle, a second set of speed-reducing gears connecting the armature-shaft with the axle, one gear of the second set of gears being loose on the axle, and a double-beveled cone friction-clutch mechanism secured on the axle intermediate of the loose gears of the speed-reducing gears, substantially as described.

2. An axle, a continuously-running electric motor, speed-reducing gears connecting the revolving armature-shaft of the motor with the axle, one of the said gears being loose on the axle, a second set of speed-reducing gears connecting the armature-shaft with the axle and differentiated from the first set of gears, one gear of the second set of gears being loose on the axle, and a clutch mechanism secured to the axle and adapted to engage the said loose gears, substantially as described.

3. The combination, with the car-axle of an electric-railway car, of a beveled hub loose on the said axle, a gear secured to said hub, an electric motor having its armature-shaft provided with a pinion to rotate said gear continuously, and a beveled friction-clutch mechanism secured to the car-axle and adapted to be inserted into the said beveled hub to revolve the car-axle, substantially as described.

4. The combination, with an electric-railway car and a continuously-rotating electric motor having its armature shaft arranged longitudinally with relation to the car and provided with a bevel-pinion, of a car-axle, a bevel-gear loose thereon driven by the bevel-pinion, and a clutch on the car-axle, substantially as described.

5. The combination, with the car-axle and gears $b'$ $b^4$, loosely mounted thereon, of an electric motor having its armature-shaft provided with a pinion to engage the pinion $b'$ and with a pinion $a^7$, a counter-shaft provided with a pinion to engage the gear $b^4$ and a gear $a^8$ to engage the pinion $a^7$, and a clutch mechanism secured to the car-axle and adapted to be moved into engagement with the gears $b'$ $b^4$, substantially as described.

6. The combination, with the car-axles of an electric-railway car, a yoke $A^3$, supported by one axle, and a motor-supporting frame supported by the other car-axle, a motor secured to said supporting-frame, having its armature-shaft supported by said frame and the yoke $A^3$, and pinions $b$ $a^7$ on the armature-shaft, of conical hubs $b^2$ $b^5$ on the car-axle, a hub $b^7$, keyed on the said axle and provided with conical ends to engage the said conical hubs, and means to move the hub $b^7$, substantially as described.

7. An axle, a conically-shaped hub loose thereon, an electric motor, its armature-shaft, and gearing between the said shaft and hub, and a hub keyed on the car-axle and provided with a conical end to engage the conically-shaped hub, whereby the rotation of the axle may be controlled, substantially as described.

8. The combination, with the car-axles of an electric-railway car, a yoke $A^3$, supported by one axle, a motor-supporting frame sustained at one end by a ball-and-socket joint on the other car-axle, and a motor secured to said supporting-frame, having its armature-shaft supported by the said frame and yoke $A^3$, of speed-reducing gears connecting the revolving armature-shaft of the motor with the axle, one of the said gears being loose on the axle, and a clutch mechanism secured on the axle to revolve therewith and adapted to be engaged with the loose gear of the speed-reducing gears, substantially as described.

In testimony whereof I have signed my name to this specification in the presence of two subscribing witnesses.

SAMUEL E. MOWER.

Witnesses:
HENRY G. THOMPSON,
L. H. DAYTON.